United States Patent
Pedersen (10) Patent No.: US 8,416,122 B1
(45) Date of Patent: Apr. 9, 2013

(54) POINT-IN-POLYGON TARGET LOCATION

(75) Inventor: Richard N. Pedersen, Toms River, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 400 days.

(21) Appl. No.: 12/779,158

(22) Filed: May 13, 2010

(51) Int. Cl.
  *G01S 13/00* (2006.01)
(52) U.S. Cl.
  USPC ............................ 342/95; 342/96; 345/423
(58) Field of Classification Search ............ 342/45, 342/52–54, 58, 59, 67, 90, 95–97, 195
  See application file for complete search history.

(56) References Cited

U.S. PATENT DOCUMENTS

| | | | | |
|---|---|---|---|---|
| 4,193,073 A | * | 3/1980 | Kohnen | 342/56 |
| 5,771,045 A | * | 6/1998 | Ghavam et al. | 345/423 |
| 7,277,046 B2 | * | 10/2007 | Adams et al. | 342/147 |
| 2004/0150551 A1 | * | 8/2004 | Artebrant et al. | 342/95 |
| 2007/0018884 A1 | * | 1/2007 | Adams et al. | 342/147 |

OTHER PUBLICATIONS

Pnpoly—Point Inclusion in Polygon Test W. Randolph Franklin (WRF); http://www.ecse.rpi.edu/Homepages/wrf/Research/Short_Notes/pnpoly.html; Dec. 31, 2009.
David G. Alciatore, Department of Mechanical Engineering Colorado State University, Fort Collins, CO; Rick Miranda, Department of Mathematics, Colorado State University; "A Winding Number and Point-in-Polygon Algorithm". Jan. 1995.
Dan Sunday; "Fast Winding Number of Inclusion of a Point in a Polygon"; http://www.softsurfer.com/Archive/algorithm_0103/algorithm_0103.htm. © 2006.

* cited by examiner

*Primary Examiner* — John B Sotomayor
*Assistant Examiner* — Marcus Windrich
(74) *Attorney, Agent, or Firm* — Howard IP Law Group, PC (57) ABSTRACT

A command and control system for analyzing target track positional information by comparing target location to pre-generated geographic information.

15 Claims, 12 Drawing Sheets

PRE-PROCESSING ALGORITHM, X-DIMENSION:
100000: FOR VERTEX COUNT V=(1 TO MAXVERTICES) DO:
    120000: FOR LINE SEGMENT COUNT L= (1 TO MAXLINESEGMENTS) DO:
        123000: IF (THE x-VALUE OF V IS GREATER THAN THE x-VALUE OF ONE VERTEX OF L AND LESS THAN THE OTHER) THEN:
            123400: PARTITION L:
                123405: FIND THE Y-VALUE FOR THE POINT (x,y) ON L
                123410: ADD THE VERTEX V-NEW WITH COORDINATES (x,y) TO THE LIST OF VERTICES
                123415: INCREMENT THE MAXVERTICES COUNT
                123420: DECOMPOSE L INTO TWO LINE SEGMENTS L1 & L2
                123425: REMOVE L FROM THE LIST OF LINE SEGMENTS
                123430: ADD THE LINE SEGMENTS L1 & L2 TO THE LIST OF LINE SEGMENTS
            123490: END PARTITION
        123900: END-IF
    129000: END-FOR LINE SEGMENT
190000: END-FOR VERTEX
NOTE: THERE ARE NOW AN EVEN NUMBER OF LINE SEGMENTS IN EACH DELTA-x BIN
200000: SORT THE VERTICES INTO BINS BY x-VALUE, AND SORT THE VERTICES WITHIN EACH BIN BY y-VALUE
210000: BUILD THE BIN DATABASE

SORTING ALGORITHM, X-DIMENSION:

10000 FOR EACH LINE SEGMENT IN THE LIST OF PRE-PROCESSED POLYGON LINE SEGMENTS DO

11000 FIND THE x-DIRECTION BIN WHOSE EXTENT OF y-DIMENSION VALUES EQUALS THE EXTENT OF THE LINE SEGMENT'S y-DIMENSION VALUES     12000 ADD THE LINE SEGMENT TO THAT BIN

12010 END-FOR

20000 FOR EACH x-DIRECTION BIN

20100 FOR EACH LINE SEGMENT IN THAT BIN

20110 SORT THE LINE SEGMENTS BY ASCENDING x-VALUE AT THE END OF THE LINE SEGMENT WHERE THE y-VALUE IS MAXIMUM         20120 IF TWO OR MORE LINE SEGMENTS IN A BIN HAVE THE SAME x-VALUE FOR THE ENDPOINT ON THE LINE SEGMENT WITH THE MAXIMUM y-VALUE, THEN SORT ALL SUCH LINE SEGMENTS USING THE ENDPOINT ON THE LINE SEGMENT WITH THE MINIMUM y-VALUE BY ASCENDING x-VALUES     20200 END-FOR     20300 FOR EVERY OTHER LINE SEGMENT IN THE SORTED BIN OF LINE SEGMENTS, STARTING WITH THE FIRST LINE SEGMENT, DO

20310 PAIR THIS LINE SEGMENT WITH THE NEXT LINE SEGMENT IN THE BIN     20400 END-FOR

21000 END-FOR

FLOW CHART FOR BUILDING THE BIN DATABASE:

ALGORITHM FOR BUILDING THE BIN DATABASE, X-DIMENSION:

100 SORT THE BINS BY ASCENDING y-DIMENSION EXTENT

200 BUILD A SEARCH TREE THAT LOCATES THE BIN CONTAINING A GIVEN VALUE OF y IN LOGARITHMIC TIME, USING CONVENTIONAL TECHNIQUES FOR SUCH PURPOSES

DATABASE RECORD STRUCTURE:

- ORDERED PAIRS OF LINE SEGMENTS: $((L_1,L_2), (L_3,L_4)...)$

- EACH LINE SEGMENT INCLUDES:

o POINT $P_1$, CONSISTING OF x & y COMPONENTS (REPRESENTED AS $L_n.P_1.x$ & $L_n.P_1.y$ FOR LINE SEGMENT $L_n$)

o POINT $P_2$, CONSISTING OF x & y COMPONENTS (REPRESENTED AS $L_n.P_2.x$ & $L_n.P_2.y$ FOR LINE SEGMENT $L_n$)

o THE SLOPE OF THE LINE SEGMENT, $m = (L_m.P_2.y - L_m.P_1.y)/(L_m.P_2.x - L_m.P_1.x)$ (REPRESENTED AS $L_n.m$ FOR THE LINE SEGMENT $L_n$) CALCULATED DURING PRE-PROCESSING

RUNTIME ALGORITHM FOR INCLUSION TEST, X-DIMENSION:

1000 FIND THE BIN TO TEST FOR INCLUSION OF POINT P IN THE POLYGON USING CONVENTIONAL LOGARITHMIC SEARCH TECHNIQUES

1100 IF TWO BINS ARE SELECTED (WHICH WILL OCCUR IF THE y-COORDINATE OF THE POINT P TO BE CHECKED, P.y IS ON THE "BOUNDARY" BETWEEN TWO BINS), THEN CHOOSE A SINGLE ONE OF THESE TWO BINS [ALWAYS SELECT EITHER THE BIN ABOVE OR THE BIN BELOW THE BOUNDARY]

2000 FOR EACH ORDERED PAIR OF LINE SEGMENTS $(L_n, L_{n+1})$ IN THE SELECTED BIN DO

2010 IF $(((P.y - L_n.P_1.y)/L_n.m + L_n.P_1.x) \leq P.x \leq ((P.y - L_{n+1}.P_1.y)/L_{n+1}.m + L_{n+1}.P_1.x))$ THEN
  <EXIT THE ALGORITHM BECAUSE P IS IN THE POLYGON>

2100 END-FOR

FIG. 7

POINT-IN-POLYGON TARGET LOCATION

This invention was made with Government Support under Contract No. N00024-05-05346 awarded by the Department of the Navy. The Government has certain rights in this invention.

BACKGROUND

Military operations require up-to-date information as to the location and intent of each object in a potential battlespace. Objects are located by various forms of sensors. A simple example of a sensor might be a soldier stationed near the battlespace, using his eyes, possibly with the aid of binoculars, and reporting object location by wireless. Another useful type of sensor is the radar system, which has the advantage of being able to survey a space from afar. The collection and use of this information to locate and discern the intent of an object is known as "Command and Control." The intent may be expressed as the object being "hostile," "neutral," or "friendly."

Information relating to a battlespace may come from many different sensors, and any one object in a battlespace may be observed by multiple sensors. Due to unavoidable limitations on the accuracy of sensor observations, there is the potential for confusion between and among the various sensors, so that sophisticated "fusion" techniques are used to fuse the data from the sensors, so as to resolve ambiguities as to what is actually sensed.

One technique for discerning the intent of an object is to associate the intent with the location or source of the object. As an example, an object sensed to be airborne over hostile territory, or tracked as having originated from a location in hostile territory, may be deemed to be hostile in the absence of countervailing information.

Figure 1:
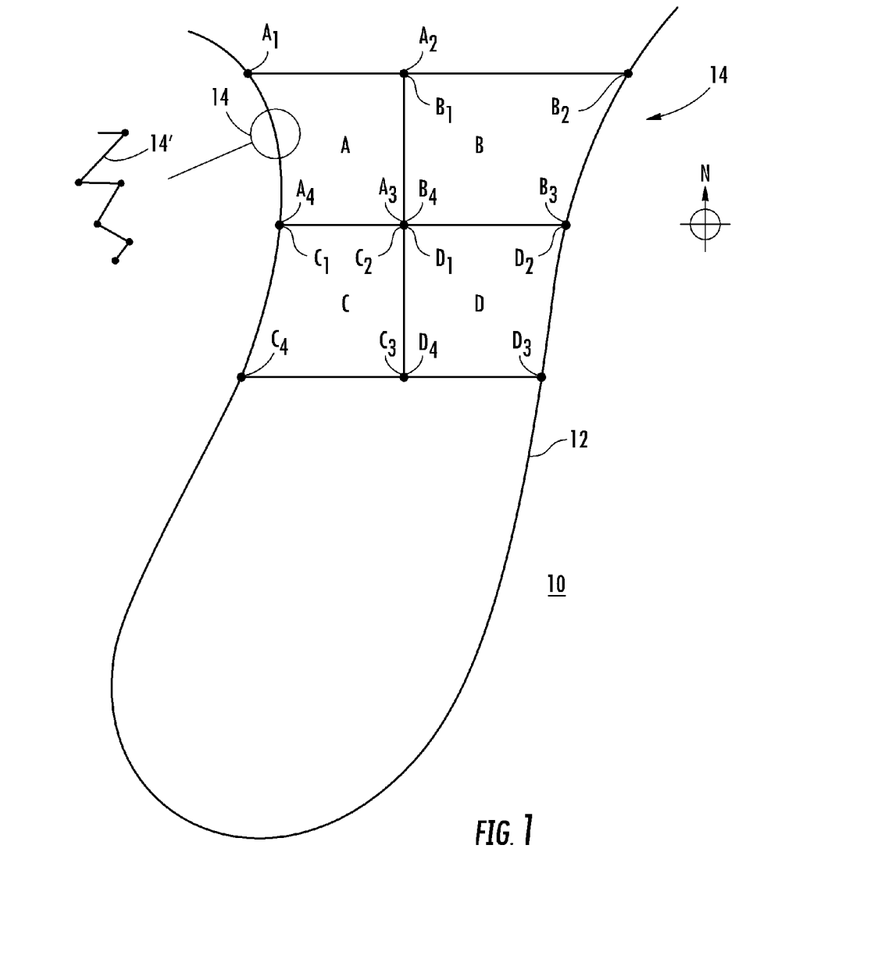
FIG. 1 is a simplified representation of a political subdivision on a land mass represented by a group of juxtaposed polygons.

Given that an object is identified by a sensor as existing in the potential battlespace, it is desirable to be able to quickly identify its location relative to any particular type of territory. A preexisting system associates the various land masses of the Earth, and more particularly the various political subdivisions, into regions defined by polygons. FIG. 1 is a simplified representation of a peninsula land mass 10 including a coastline 12. Coastline 12 appears smooth at the resolution of FIG. 1, but is actually rough. The portion of coastline 12 within circle 14 contains bays, inlets, and other features, which are followed, at the resolution of the polygon, as illustrated by detailed coastline portion 14'. Depending upon the size of the political subdivision 14, it may be represented by a single polygon or, as in FIG. 1, by a plurality of juxtaposed polygons A, B, C, and D. Polygon A is defined by vertices A1, A2, A3, A4, and innumerable other vertices associated with its coastline. Similarly, polygon B is defined by vertices B1, B2, B3, B4, and other vertices associated with its coastline. Vertex A2 of polygon A is the same as, or contiguous with, vertex B1 of polygon B. For completeness, polygon C is defined by vertices C1, C2, C3, and C4, and other vertices associated with its coastline, and polygon D is defined by vertices D1, D2, D3, and D4, and other vertices associated with its coastline. Each vertex is defined by its latitude and longitude.

One function of a Command and Control system is analysis to determine, from the sensed (and possibly fused) location information relating to each object, whether it lies within one of the polygons of political subdivision 14. This type of problem is typically solved by a computer algorithm. One method for solution is termed a "Crossing Number" (CN) method, and another method is the "Winding Number" (WN).

In the CN method, the number of times a ray originating at the target crosses the polygon boundary edges is noted, and the target is deemed to be outside the polygon when the crossing number is even, and inside when it is odd. The CN and WN methods are conceptually similar; however the arithmetics of the implementations differ. In the WN method, the number of times the polygon winds around or about the target is noted, and the target is deemed to be outside the polygon when the number equals zero, and within otherwise. The winding number method starts at a vertex of the polygon and steps through each segment of the polygon comparing the target point to the segment, keeping a running count of whether the target point is to the left or to the right of the line segment, thus decrementing the running count if the target point is to the right, and incrementing the running count if to the left. If, after traversing all the line segments, the running total is not zero, the point is within the polygon. In a version of the winding number method, the right/left check is only performed on those segments where the range or domain of the segment overlaps the corresponding coordinate of the point. This version of the winding number algorithm, while more computationally efficient than the basic algorithm, is still of complexity O(n), where n is the number of line segments.

The complexity of the winding number method as applied to polygons having many line segments requires computation times which make it less desirable for use in a Command and Control system, as the location information may arrive after the usefulness of the information is past. The number of segments associated with a coastline is very large.

A more rapid method of determining whether the point is within the polygon is desired.

SUMMARY

A situational awareness arrangement or system for computer-based classification of target information is disclosed, where the target location is expressed in terms of geographic regions of interest. The arrangement comprises a fusion arrangement for receiving sensed information relating to target location, for fusing the sensed information to generate fused target information. A location determination algorithm is coupled for receiving fused sensed target information. The location determination algorithm includes a polygon selecting arrangement for selecting polygons associated with the regions of interest. Each of the polygons defines a plurality of vertex nodes separated by line segments. The location determination algorithm includes a first preprocessing arrangement for projecting in a selected ordinate direction from each vertex node to the intersection at a node with another line segment, to thereby define bins extending in the selected ordinate direction, each of which bins includes line segments of the polygon and projection lines extending between nodes. The location determination algorithm also includes a second preprocessing arrangement for ordering the line segments according to their other ordinate values to thereby generate at least one set of ordered bins. A third preprocessing arrangement sorts the bins in one of an ascending and descending order to thereby build a bin database. A fourth preprocessing arrangement builds an accelerated search tree from the bin database. A first run-time processing arrangement processes target position measurements in conjunction with the set of ordered bins by selecting (a) that one of the bins from the ordered set of bins in which the target coordinate value in the ordinate direction (x, for example) lies, and, (b) if there are plural bins which encompass the target coordinate value in the ordinate direction, selecting that one of the bins in which the target coordinate value in the ordinate direction lies and in which the target coordinate values in the other ordinate direction lies. A second run-time processing arrangement deems the selected one of the bins to be the bin in which the target coordinate values lie, thereby establishing in which region the selected one of the bins lies. This, in turn, establishes the location of the target in terms of the geographic region of interest. In a particular embodiment of the arrangement, the accelerated search tree is a logarithmic search tree.

A situational awareness arrangement is for computer-based classification of sensed target information as a function of target location, where the target location is expressed in terms of geographic regions of interest. The situational awareness arrangement comprises a fusion arrangement for receiving sensed information relating to at least one of the present and previous locations of a target and, if available, other target-related information, for fusing the sensed information to aid in determining at least the friendly or hostile nature of the target. The situational awareness arrangement also includes a location determination algorithm coupled for receiving fused sensed target information. The location determination algorithm (A) selects polygons associated with the regions of interest, with each of the polygons defining a plurality of vertex nodes separated by line segments. The location determination algorithm also includes (B) preprocessing of at least one of the polygons by (a) establishing a set of additional nodes by projecting in a selected ordinate direction from each vertex to the intersection at a node with another line segment, to thereby define bins extending in the selected ordinate direction. Each of these bins includes line segments of the polygon and projection lines extending between vertices and nodes. The preprocessing also (b) orders the line segments according to their other ordinate value, to thereby generate at least one set of ordered bins. The preprocessing also (c) sorts the bins in an ascending or descending order to build a bin database, and (d) builds an accelerated search tree, which may be a logarithmic search tree. The location determination algorithm also (C) processes target track position measurements in conjunction with the set of ordered bins by selecting (a) that one of the bins from the ordered set of bins in which the target coordinate value in the ordinate direction lies, and, (b) if there are plural bins which encompass the target coordinate value in the ordinate direction, selecting that one of the bins in which the target coordinate value in the ordinate direction lies and in which the target coordinate values in the other ordinate direction lies. The selected one of the bins is deemed to be the bin in which the target coordinate values lie, thereby establishing in which region the selected one of the bins lies.

DETAILED DESCRIPTION

Figure 2:
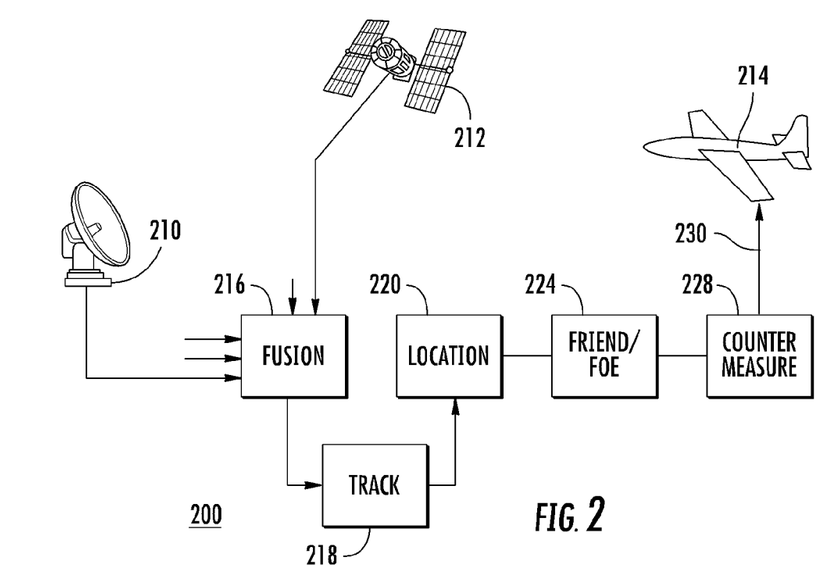
FIG. 2 is a simplified representation of a command and control system including sensors for sensing a target, a fusion arrangement for fusing sensor information, a location determination arrangement according to an aspect of the disclosure for determining whether the target lies within the political subdivision, a friend/foe decision function, and a countermeasure block for responding to a "foe" designation by attacking the target.

In FIG. 2, a Command and Control System 200 includes a plurality of sensors in the form of a radar sensor 210 and an Overhead Non-imaging Infrared (ONIR) sensor 212, each of which is capable of sensing a target 214. Other and additional types of sensors may be used. The sensed information is coupled from the illustrated sensors, and from other sensors, to an information fusion function illustrated as a block 216. Information fusion block 216 fuses the multiple instances of information, as known in the art, to ideally produce one set of information for each target. The target information flows from block 216 to a tracking block 218 to generate a track of the past locations of the target. The track data, including the current target location, flows from tracking block 218 to a target location determination block 220, which receives the track and location information and processes the information according to aspects of the disclosure to determine current or past target location vis-à-vis one (or a plurality, if applicable) of the polygons of FIG. 1. Once a determination is made as to whether the origin or location of the target object is within or without the polygon, the information flows to a block 224, which decides, in conjunction with other input information (if any) if the target is hostile, friendly or neutral (friend/foe). This decision may be vetted by a human operator to provide some assurance against untoward results. From block 224, the friend/foe information is applied to a countermeasure block 228, which implements countermeasures against a hostile target in known fashion. The countermeasures are represented as an arrow 230.

Figure 3A:
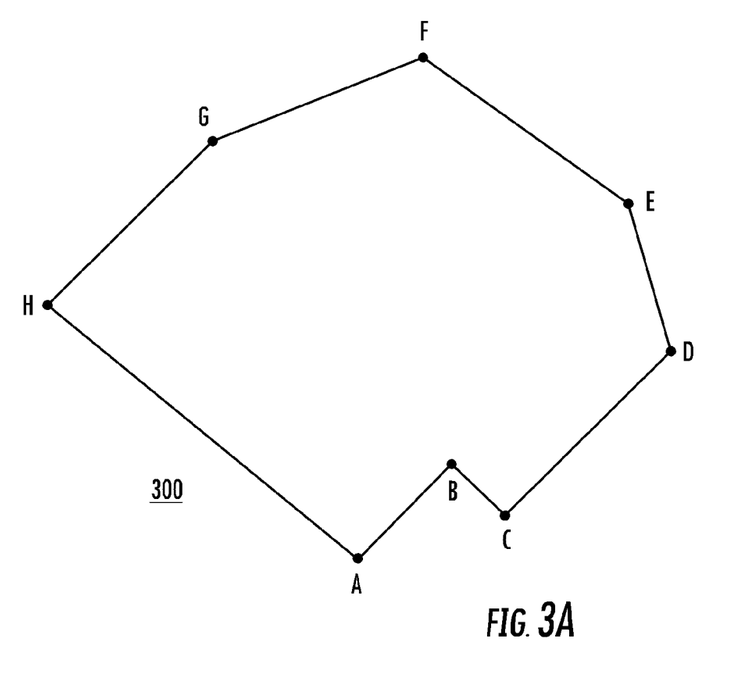
FIG. 3A is a representation of a polygon which may be used to aid in understanding processing according to the disclosure.

FIG. 3A is a simplified representation of a general polygon 300 defining vertices A, B, C, D, E, F, G, and H. The algorithm for determining the location of a target or point as being within or without the polygon has a complexity of O(log n), and as such is much faster than the O(n) complexity of prior-art winding-number algorithms. The algorithm includes a preprocessing portion and a processing portion. The preprocessing portion of the algorithm runs off-line without any track data applied to it. The pre-processing algorithm formats the polygons for use by the processing portion of the algorithm. The run-time processing portion of the algorithm runs in real time as the sensors are measuring and reporting track position updates. The run-time processing compares each of the reported track position updates to the polygon using only those line segments indicated by a directed search guided by the pre-processed data.

By convention, coordinates on the earth are specified using degrees of longitude east or west of Greenwich, England and degrees of latitude north or south of the equator. For convenience of representation, the east-west dimension is referred to herein as the "x-dimension," and the north-south dimension is referred to herein as the "y-dimension."

Figure 3B:
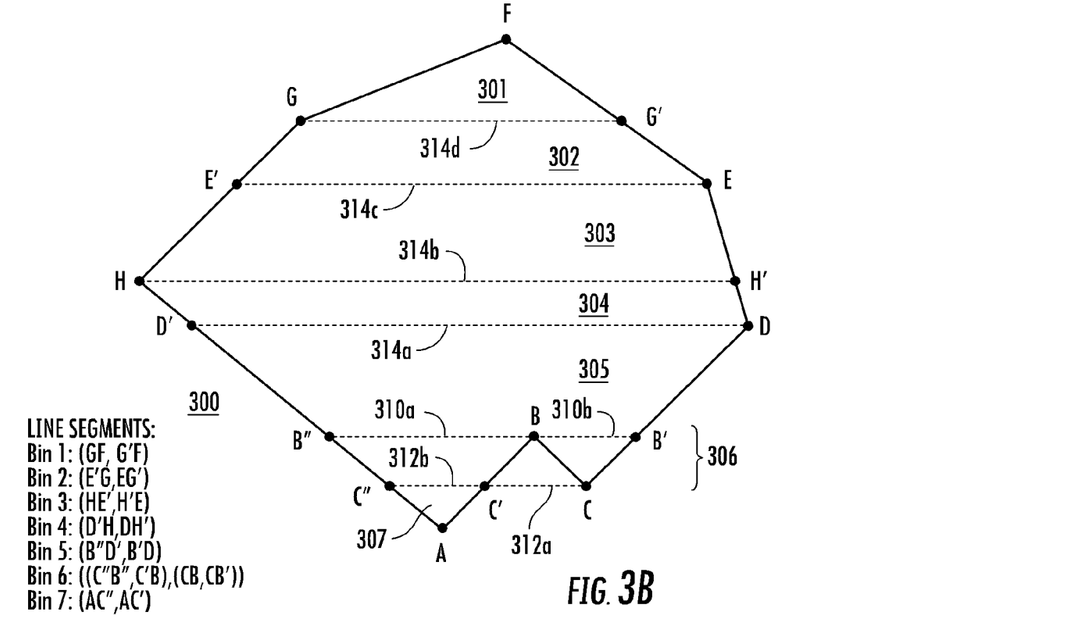
FIG. 3B represents processing of the polygon of FIG. 3A in an x direction according an aspect of the disclosure.

FIG. 3B illustrates the polygon of FIG. 3A after additional preprocessing steps. In FIG. 3B, horizontally-disposed dash lines extend from a periphery at each of the capital-letter-designated vertices (A, B, C, D, E, F, G, and H) through the interior of polygon 300 to intersect another periphery of the polygon. More particularly a horizontal line 310a/310b extends horizontally to the right and to the left from vertex B, intersecting line CD at point, node or vertex B' and line AH at a point B", thereby spanning the full extent of the polygon with combined segments 310a and 310b. Similarly, a horizontal dash line including segments 312a and 312b extends to the left from vertex C, with portion 312a lying outside of the polygon 300, and portion 310b lying within the polygon. Line segment 312a ends at a node C" on line segment AH and at a node C' on line segment AB. Also in polygon 300, a dash line 314a extends leftward from vertex D to intersect line segment AH at a node D', a dash line 314b extends to rightward from vertex H to intersect line segment DE at a node H', a dash line 314c extends leftward from vertex E to intersect line segment GH at a node E', and a dash line 314d extends rightward from vertex G to intersect line segment EF at a node G'. The horizontally disposed dash lines within polygon 300 of FIG. 3B divide the polygon into portions termed "bins." The illustrated bins are set forth in FIG. 3B. Bin 301 is defined by line segments (GF, G'F), bin 302 is defined by line segments (E'G, EG'), bin 303 is (HE', H'E), bin 304 is (D'H, DH') bin 5 is (B"D', B'D), bin 6 is ((C"B", C'B),(CB, CB')), and bin 7 is (AC", AC').

Pre-processing puts the polygon's line segments into "bins" that are used in the run-time or principal processing stage. A single line segment may be decomposed into multiple co-linear line segments whose combination accurately represents the original line segment. The pre-processing stage uses this principle to decompose any polygon into line segments completely contained in the bins used in the run-time stage. Pre-processing creates a list of either x-dimension bins or y-dimension bins (or both, if desired). The bins illustrated in FIG. 3B are x-dimension bins. The contents of the bins are arranged to facilitate the identification in O(log n) time of the bin that might contain the point representing the location of the target. Pre-processing may be used to compute two sets of bins, one for the x-dimension, and the other for the y-dimension; however, the pre-processing will in that case select that dimension containing the smaller number of bins so as to reduce the number that need to be searched during run-time processing.

For x-dimension bins, each bin represents those line segments of the polygon or geometry object contained in a horizontal band running through the polygon. For y-dimension bins, each bin represents those line segments of the geometry object contained in a vertical band running through the geometry object. Each line segment is completely contained within a single bin, and each bin contains an even number of line segments.

Only one set of bins, in either the x-dimension or the y-dimension, is used following the preprocessing for the run-time stage of processing. The preprocessing may construct both sets of bins and select the dimension with the smallest number of bins for use at run-time. Alternatively, the user may want to analyze the estimated complexity of the bins during pre-processing to identify whether to build one or both bins. The pre-processing construction and run-time use of both bins is described for completeness.

Figure 3C:
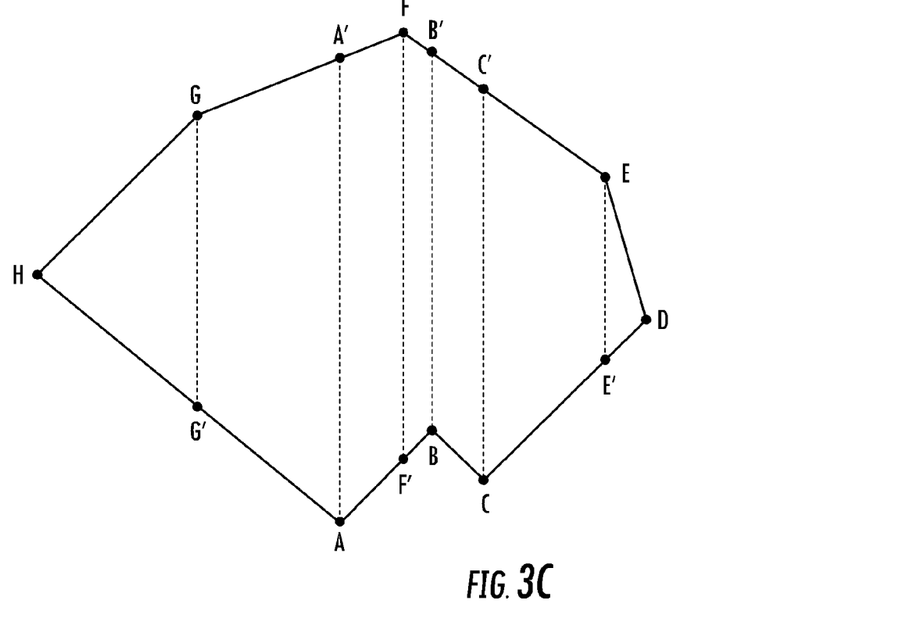
FIG. 3C illustrates the result of processing of the polygon in the y direction.

FIG. 3C illustrates polygon 300 of FIG. 3A following preprocessing in the y-direction. In FIG. 3C, the bins extend vertically or in the y-direction through the polygon 300. The bins illustrated in FIG. 3C include bin 1 (GH, G'H), bin 2 (AG', A'G), bin 3 (AF', A'F), bin 4 (FB', F'B), bin 5 (CB, C'B'), bin 6 (CE', C'E), and bin 7 (ED, E'D). When y-dimension bins are to be constructed, they are generated in a manner similar to that of the x bins. The result of the y-direction preprocessing is essentially identical to the diagram of FIG. 3B, with "x" replaced by "y" and vice versa. Such a y-dimension logic compares each vertex in the polygon to each line segment.

Figure 4A:
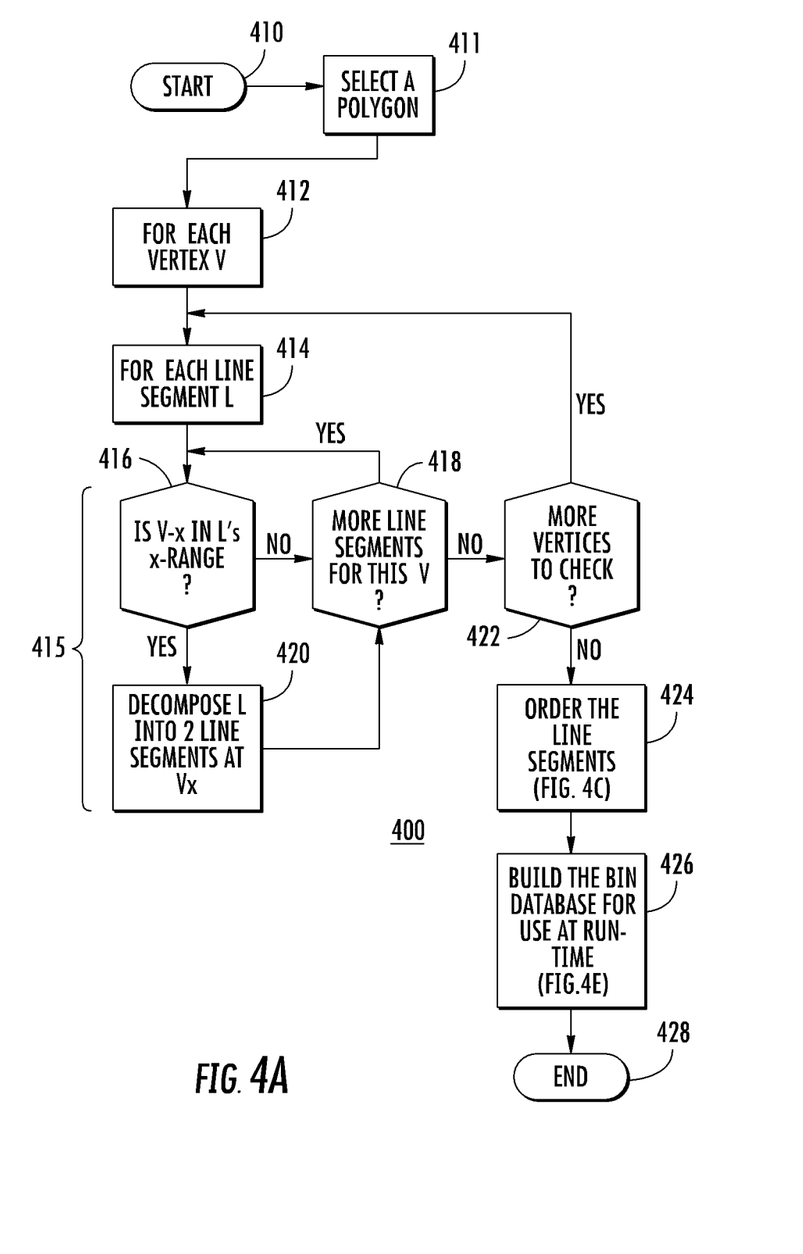
FIG. 4A is a simplified computer logic or control diagram illustrating steps of preprocessing according to an aspect of the disclosure, and FIG. 4B sets forth lines of code of a portion of the preprocessing according to FIG. 4A.
Figure 4B:
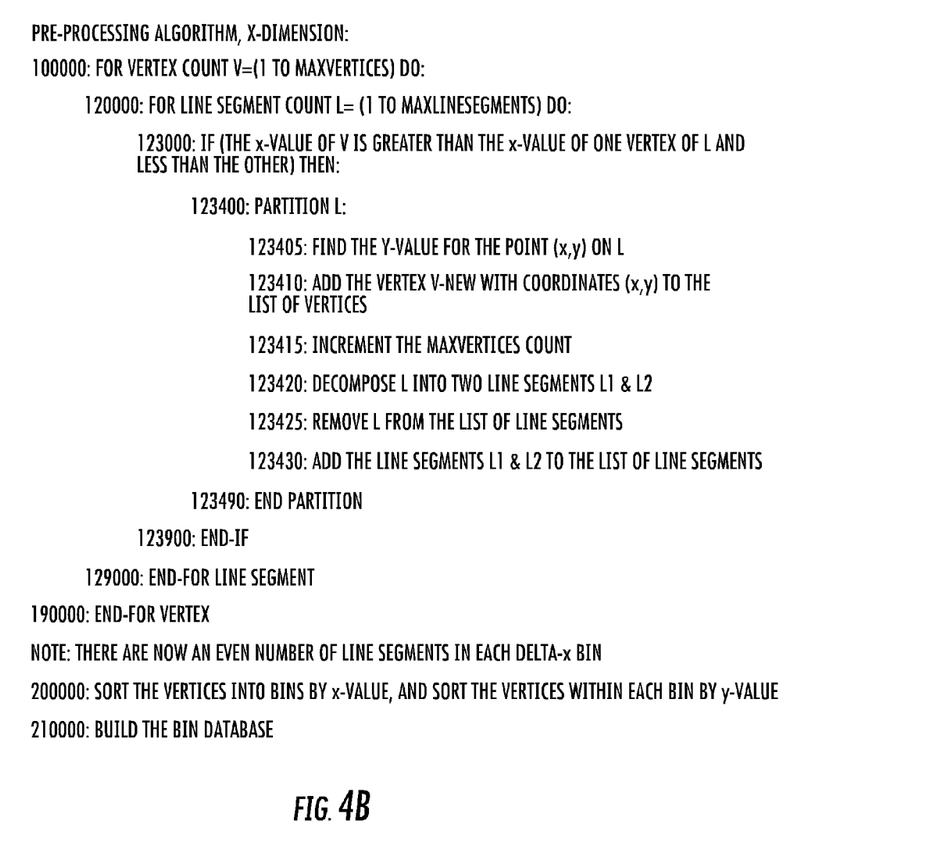

FIG. 4a is a simplified logic or control flow chart or diagram illustrating steps associated with preprocessing 400 in the x-dimension according to an aspect of the disclosure. FIG. 4B is a statement of a portion of the algorithm associated with FIG. 4A. In FIG. 4A, the logic starts at a START block 410, and flows to a block 411, which represents the selection of one of the polygons A, B, C, or D of FIG. 1 on which to start the preprocessing. The logic flows to a block 412, which represents processing of indices for evaluating each vertex V of the polygon in sequence. These vertices might be, for example, vertices A through H of FIG. 3B. From block 412, the logic 400 of FIG. 4A flows to a block 414, representing processing of indices for evaluating each line segment L. Line segments L may be, for example, line segments AB or BC of FIG. 3B. From block 414 of FIG. 4A, logic 400 flows to a decision block 416. Decision block 416 decides whether the x value of the vertex under evaluation (V-x) lies within the x range of line segment L. If the vertex's x-value is not within the x-range of the line segment under evaluation, the logic leaves decision block 416 by the NO output, and flows to a further decision block 418. For example, in the case of a vertex C, the x-value of which will be indicated herein as "C-x", and a line segment AB, if it is found that C-x does not lie between A-x and B-x, then the x-value of vertex C is not within the x-range of line segment AB. Decision block 418 determines if more line segments are to be evaluated for the vertex currently under evaluation, and if so adjusts the line segment indices as necessary and returns the logic to decision block 416 for further evaluation. If decision block 416 finds that the x-value of the vertex under consideration lies within the x-range of the line segment under consideration, the logic is routed by the YES output to a block 420. Block 420 represents the decomposition of the line segment into two line segments at V-x. From block 420, the logic returns to decision block 418. Decision block 418 continues to route the logic back to decision block 416 so long as more line segments are available to be evaluated at the vertex currently under consideration. Eventually, there will be no more line segments to evaluate in conjunction with the current vertex, and the logic leaves decision block 418 by the NO output, and arrives at a further decision block 422. Decision block 422 examines the indices, as may be appropriate, to determine if any more vertices need to be evaluated. So long as further vertices need to be evaluated, it adjusts the vertex indices as necessary, whereupon the logic leaves decision block 422 by the YES output, and returns to block 414. If no more vertices remain to be evaluated, the logic leaves decision block 422 by the NO output, and arrives at a block 424, which represents ordering of the line segments. Details of block 424 are illustrated in conjunction with FIGS. 4C and 4D. When the indices are sorted, the logic leaves block 424, and arrives at a block 426, which represents the building of the bin database in readiness for run-time processing. Details of the processing in block 426 are illustrated in FIGS. 4E and 4F. The preprocessing ends at an END block 428. It should be noted that the preprocessing may be done as a preliminary step, so long as the polygons are known. That way, the vertices are sorted and the bin database can be generated off-line, and require no further processing for determining the location of the target.

Figure 4C:
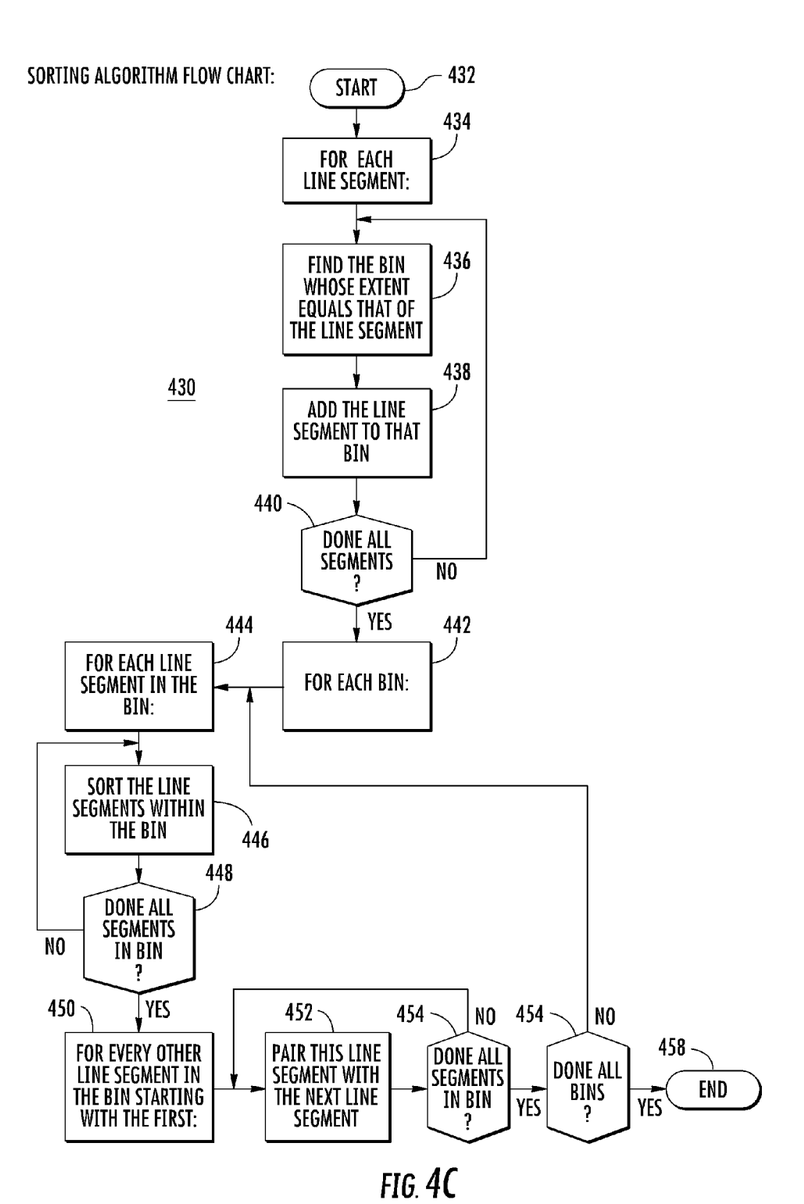
FIG. 4C is a computer logic or control diagram representing a portion of the preprocessing of FIG. 4A for sorting polygon bins, and FIG. 4D sets forth lines of code representing the processing of FIG. 4C.
Figure 4D:
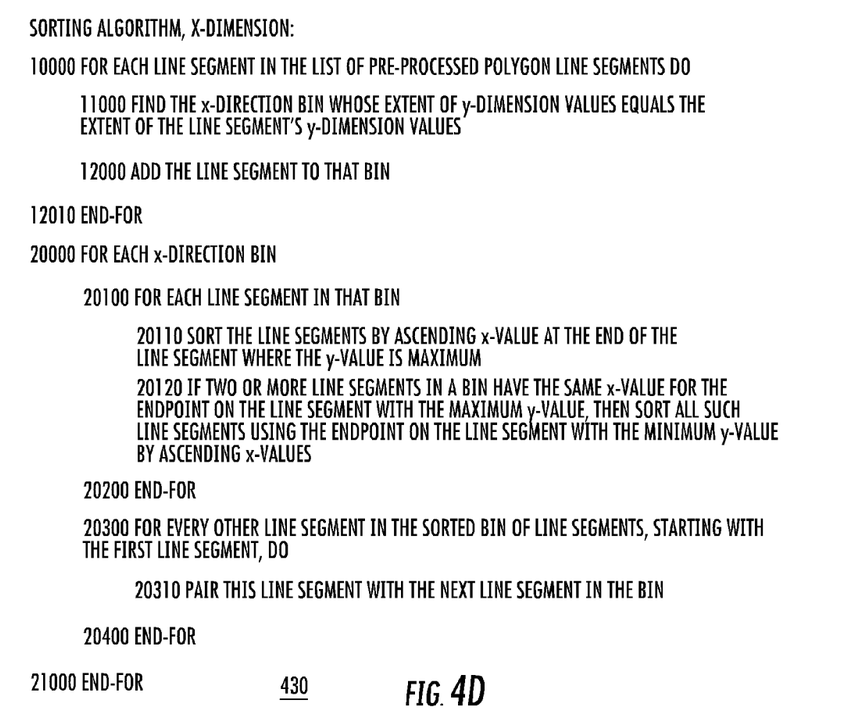
Figure 4E:
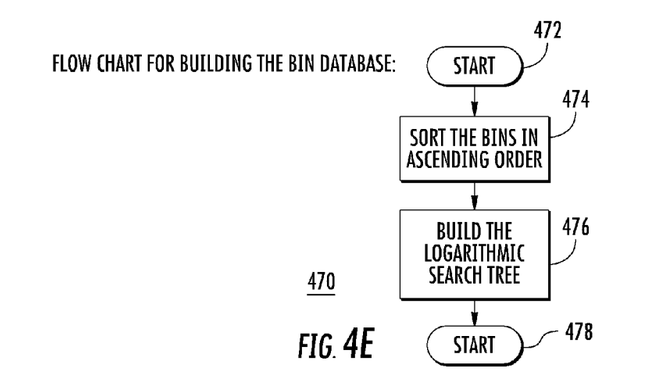
FIG. 4E is a computer logic or control diagram representing a portion of the preprocessing of FIG. 4A for building a bin database, and FIG. 4F sets forth lines of code representing the processing of FIG. 4E.
Figure 4F:
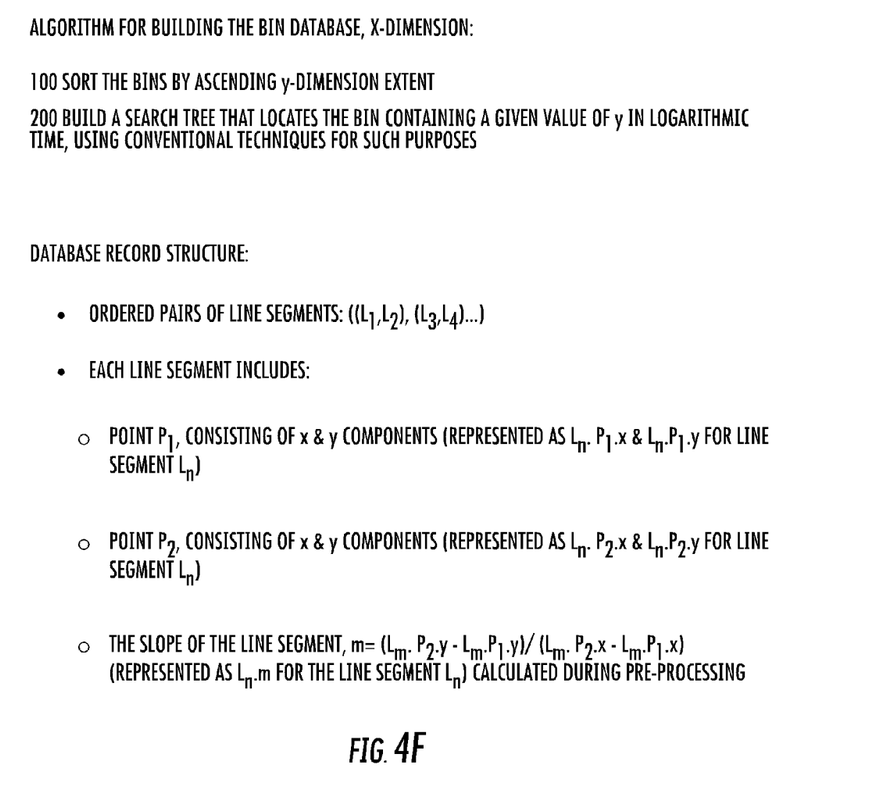

FIG. 4C is a simplified logic flow chart or diagram illustrating the sorting of the line segments into their proper bins. For example, referring to FIG. 3B, it is necessary to determine which bin contains or is associated with each line segment. Thus, line segment HE' must be associated with or deemed to be contained in bin 303. In FIG. 4C, the logic begins at a START block 432, and flows to a block 434. Block 434 represents processing of indices for sequential processing of each line segment of the polygon 300. From block 434, the logic flows to a block 436, which finds that bin which has a y-extent equal to that of the line segment. For example, referring to FIG. 3B, when processing line segment HE', bin 303 is found to have a y-direction extent which encompasses HE'. From block 436 the logic flows to a block 438. Block 438 adds the line segment in question, namely line segment HE', to bin 303. Eventually, line segment H'E will also be added to bin 303. As another example, when evaluating line segment B"C", its y-direction extent lies in bin 306, which is a bin which contains more than two line segments. From block 438, the logic 430 of FIG. 4C flows to a decision block 440, which determines if all the line segments have been evaluated. If not, the logic returns by the NO output to block 436 to begin evaluation of another line segment. If all of the line segments have been evaluated, the logic leaves decision block 436 by the YES output, and flows to a block 442. Thus, at this stage of the preprocessing, all of the line segments have been associated with bins.

Block 442 of FIG. 4C begins a new logic process, namely the sorting of the line segments in each bin. Block 442 represents index manipulation for sequentially evaluating each bin. From block 442, the logic 430 flows to a block 444, representing evaluation of each line segment in each bin under consideration. Block 446 represents the sorting of the line segments in each bin. For example, bin 303 contains line segments HE' and H'E. Sorting of these two line segments determines which line segment of the pair lies to the left or right of the other. This is accomplished by evaluating the x extent of the line segments. In the case of the example, line segment HE' has an x extent of lesser values than EH', so HE' is to the left of EH'. In a like manner, bin 306 sorts its four line segments as B"C" to the left of BC', BC' to the left of BC, and B'C to the right of all. From block 446, the logic 430 flows to a decision block 448. Block 448 examines indices to determine if all line segments in the bin are evaluated. If more line segments remain to be done, the logic flows from decision block 448 back to block 446. Eventually, all the line segments will have been evaluated, and the logic leaves decision block 448 by the YES output to arrive at a block 450. Block 450 starts the process of, when the bin in question contains more than two line segments, arranging the line segments sequentially arranged in the bin into adjacent pairs. The actual pairing is performed in block 452. That is, if a bin contains sequential line segments L1, L2, L3, L4, . . . , they are grouped as (L1, L2), (L3, L4), . . . . From block 452, the logic of FIG. 4C flows to a decision block 454, which determines if all the line segments in the current bin have been paired. If not, the logic returns to block 452 to pair the remaining line segments. If all the line segments are done, the logic flows to a further decision block 456 for a determination of whether all the bins have been evaluated. If not, the logic returns to block 444 for further evaluation. If so, the logic ends at an END block 458. This completes the preprocessing sorting of the vertices in block 424 of FIG. 4A.

A portion of the preprocessing is the construction of the bin database, which is performed in block 426 of FIG. 4A. The construction of the bin database portion of the preprocessing is explained with the aid of FIG. 4E. FIG. 4E is a simplified computer logic or control flow diagram or chart 470. The logic 470 of FIG. 4E begins at a START block 472, and flows to a block 474. Block 474 represents the sorting of the bins, such as bins 301, 302, 303, . . . of FIG. 3B. The sorting is accomplished by sorting the bins in accordance with their y extent, corresponding, for example, sorting from top to bottom in FIG. 3B. Assuming that the bins are numbered in a manner corresponding to that of FIG. 3B, the ordering might be 301, 302, 303, . . . . From logic block 474 of FIG. 4E, the logic flows to a block 476, which represents the building of a well-known binary search tree, in which a particular leaf or end node can be identified as a multistep selection. Thus, any one of N leaves in a binary tree can be identified by $\log_2$ N steps. For example, in the case in which N=1024, $\log_2$ 1024=10. This can be viewed as setting up a selection tree of y extents for the bins, which can be sorted through by the run-time processing.

Figure 6A:
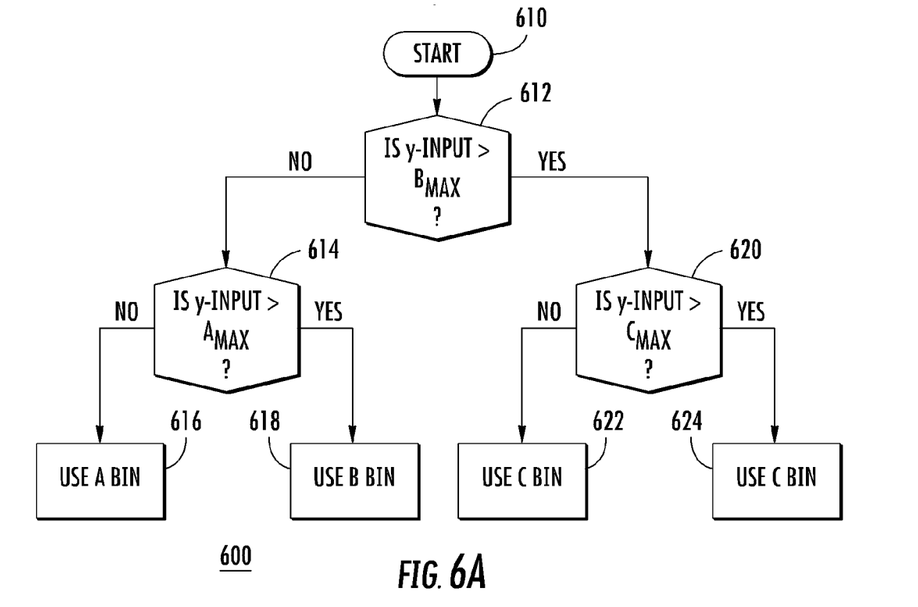
FIG. 6A is an example of the binary search tree algorithm used to locate the appropriate bin to use in the runtime processing.
Figure 6B:
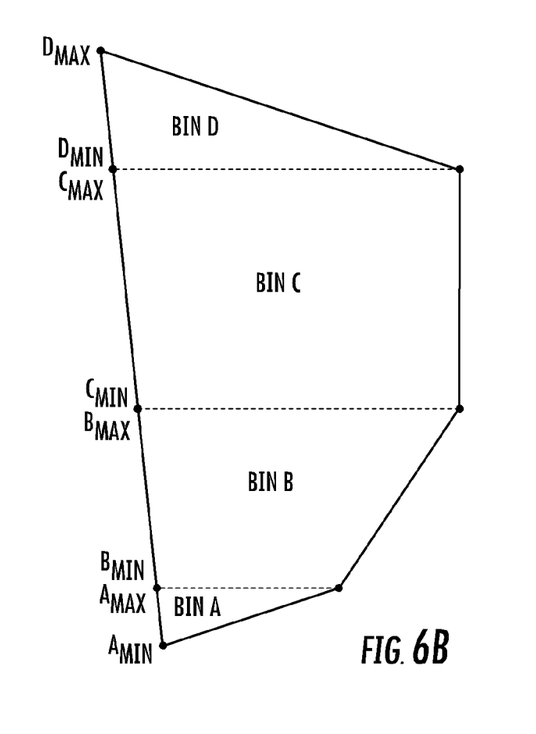
FIG. 6B shows the polygon and its constituent bins that are represented in FIG. 6A.

FIG. 6A illustrates a highly simplified binary search tree in the form of a flow chart 600 having three levels, such as might be constructed by block 476 of FIG. 4E. FIG. 6B illustrates a polygon which can be used with the tree of FIG. 6A. In FIG. 6A, tree or logic 600 begins at a START block 610, and the logic flows to a decision block 612, which decides if the y-location of the target is greater than the maximum y extent of bin B (is the y-location of the target $>B_{MAX}$?) If not, the logic 600 flows from the NO output of block 612 to a further decision block 614. Decision block 614 decides if the y-location of the target is greater than the maximum value of y of bin A (is y-input $>A_{MAX}$?). If not, the logic flows by the NO output of block 614 to a block 616, representing a decision to use the A bin. If decision block 614 finds that the y-location of the target is greater than the maximum y-extent of the A bin (is y-input $>A_{MAX}$?), the logic flows by the YES output to a block 618, which represents a decision to use the B bin. Correspondingly, if decision block 612 finds that the y-location of the target is greater than BMAX, the logic leaves block 612 by the YES output, and arrives at a further decision block 620. Decision block 620 routes the logic by its NO output to a block 622 if it finds that the y target location is not greater than $C_{MAX}$, and to a block 624 if it finds that the y target location is greater than $C_{MAX}$, thereby deeming the C and D bins, respectively, to be the ones to use. From search tree construction block 476, the logic 470 flows to an END block 478, which completes the preprocessing.

Figure 5A:
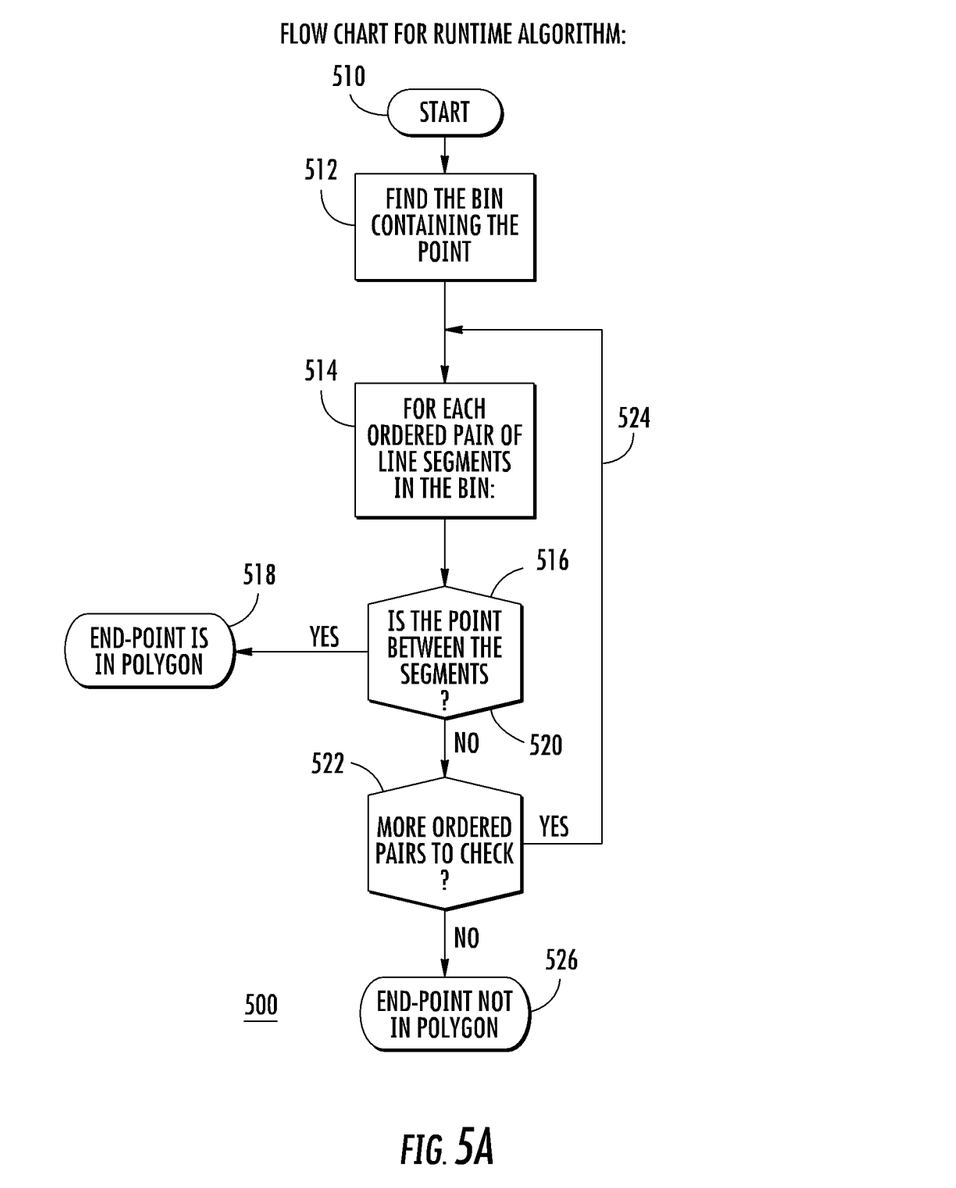
FIG. 5A is a computer logic or control diagram representing the run-time processing performed after the preprocessing in order to determine if the target or point at issue lies within or without the polygon, and FIG. 5B sets forth lines of code for implementing the run-time processing of FIG. 5A.
Figure 5B:
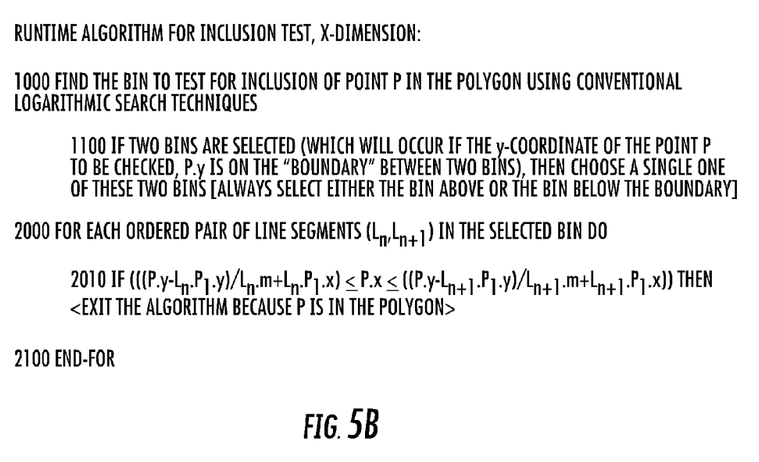

The preprocessed information may be stored in memory for later use, or used immediately. FIG. 5A illustrates a runtime computer control or logic flow 500 setting forth the runtime algorithm. As mentioned, the purpose of the preprocessing is to simplify the runtime processing as much as possible in order to be able to quickly identify that bin in which the target resides (or resided, if appropriate). In FIG. 5A, the logic begins at a START block 510, and flows to a block 512. Block 512 represents the invocation of the binary search tree to locate the bin of interest, namely the bin containing the target y-coordinate. From block 512, the logic flows to a block 514. Block 514 is directed toward the problem associated with more than two line segment in each bin, as illustrated by bin 306 of FIG. 3B. Block 514 considers ordered pairs of line segments in the bin under consideration, and routes the logic to a decision block 516. Decision block 516 determines if the x-value of the target location lies between the line segments. If so, the logic leaves decision block 516 by the YES output, and arrives at a block 518, which represents a determination that the target or end point lies in the polygon defined by the line segments. If the x-value of the target location does not lie between the line segments, the logic leaves decision block 520 by the NO output, and arrives at a block 522. Block 522 operates on the running indices to coact with block 514 to route the logic flow back to block 514 by way of a path 524 if not all the ordered pairs of line segments have been evaluated. Eventually, all the line segments will have been evaluated, and the logic flows from block 522 to an END block 526.

Figure 7:
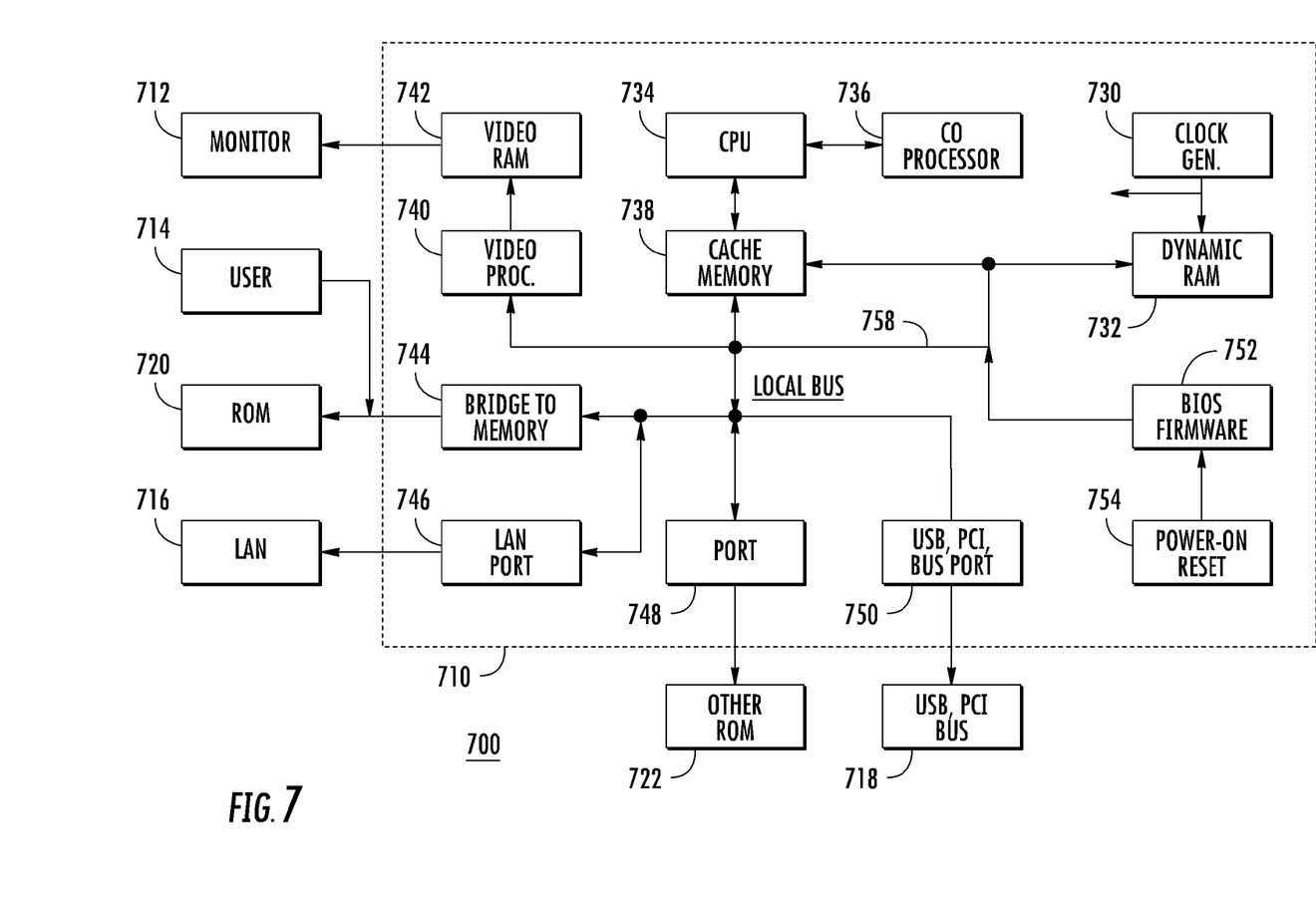
FIG. 7 is a simplified diagram in block and schematic form illustrating details of a computer which may be used to perform some or all of the processing according to aspects of the disclosure.

FIG. 7 is a simplified diagram in block and schematic form illustrating a representative computer 700 which may be used to perform the functions of fusion block 216, track block 218, and/or location processing block 220 of FIG. 2. In FIG. 7, computer 700 includes a processor or board 710 and outboard elements such as a monitor 712, user controls such as a keyboard and/or mouse, illustrated as a block 714, local area network (LAN) 716, additional buses 718 such as PCI and/or USB, and read-only memory (ROM) 720, which is ordinarily a hard drive, and additional ROM 722, which may be, for example, a flash memory stick or compact disk (CD) drive. The main portion of the computer processor or board 710 includes a central processing unit (CPU) 734, which communicates with a cache dynamic memory 738. At initial turn-on of the computer 700, a power-on reset illustrated as a block 754 enables a preloaded basic input/output system (BIOS) flash memory, which loads cache 738 with information that initializes the booting sequence by the CPU. When booted, CPU 734 may communicate with a coprocessor illustrated as 736, and also communicates with main dynamic memory (DRAM) 732 and a local bus 758. Local bus 758 provides communication between the CPU and other elements of the computer, as for example the video processor 740 and video random-access memory 742 for driving a monitor. Local bus 758 also communicates by way of a bridge 744 to external ROM 720 and to user controls 714. Local bus 758 further communicates by way of a port 748 with other ROM 722 if desired, by way of a USB or PCI bridge or port 750 with external buses, and/or by way of a local area network (LAN) port 746 with a LAN 716. Those skilled in the art will understand how to use one or more computers to perform the processing required by elements of the disclosure.

While the description addresses only two-dimensional polygons, those skilled in the art will recognize that the algorithm can be extended to any desired number of dimensions. Also, the description is limited to the treatment of polygons with non-overlapping vertices (such as the polygon representation of a figure-eight), but those skilled in the art will recognize that the effects of such special cases can be resolved in straightforward manner during the preprocessing step by introducing additional line segments and vertices to account for overlaps. Further, if the target point falls on a bin boundary, and thereby could be conceptually thought to be contained in either of two adjacent bins, those skilled in the art will recognize that the target position only needs to be compared to one of the two adjacent bins, and that the choice of which bin to use is arbitrary. If, during preprocessing, it should be discovered that a polygon's line segment is parallel to ordinate axis being used in decomposing the polygon into bins (for example, line segment AB where A−y=B−y for an x-direction bin decomposition), those skilled in the art will recognize that there is no need to explicitly include such a line segment within the bin's collection of line segments to be used in the runtime processing, since it is clearly included within the area of this bin.

A situational awareness arrangement according to an aspect of the disclosure (200) is for computer-based (700) classification of target (214) information, where the target location is expressed in terms of geographic regions of interest (A, B, C, D of FIG. 1). The arrangement (200) comprises a fusion arrangement (216) for receiving sensed information relating to target location, for fusing the sensed information to generate fused target information. A location determination algorithm (220) is coupled for receiving fused sensed target information. The location determination algorithm (220) includes a polygon selecting arrangement (411) for selecting polygons (300) associated with the regions of interest. Each of the polygons (300) defines a plurality of vertex nodes separated by line segments. The location determination algorithm (220) includes a first preprocessing arrangement (415) for projecting in a selected ordinate direction (x direction, for example) from each vertex node to the intersection at a node with another line segment, to thereby define bins extending in the selected ordinate direction (x, for example), each of which bins includes line segments of the polygon and projection lines extending between nodes. The location determination algorithm also includes a second preprocessing arrangement (424) for ordering the line segments according to their other ordinate values (y, for example) to thereby generate at least one set of ordered bins. A third preprocessing arrangement (474) sorts the bins in one of an ascending and descending order (474) to thereby build a bin database. A fourth preprocessing arrangement (476) builds an accelerated search tree (600) from the bin database. A first run-time processing arrangement (512) processes target position measurements in conjunction with the set of ordered bins by selecting (a) that one of the bins from the ordered set of bins in which the target coordinate value in the ordinate direction (x, for example) lies, and, (b) if there are plural bins which encompass the target coordinate value in the ordinate direction, selecting that one of the bins in which the target coordinate value in the ordinate direction lies and in which the target coordinate values in the other ordinate direction lies. A second run-time processing arrangement (518) deems the selected one of the bins to be the bin in which the target coordinate values lie, thereby establishing in which region the selected one of the bins lies. This, in turn, establishes the location of the target in terms of the geographic region of interest. In a particular embodiment of the arrangement, the accelerated search tree is a logarithmic search tree.

A situational awareness arrangement (200) is for computer-based (700) classification of sensed target (214) information as a function of target location, where the target location is expressed in terms of geographic regions of interest (A, B, C, D of FIG. 1). The situational awareness arrangement (200) comprises a fusion arrangement (216) for receiving sensed information relating to at least one of the present and previous locations of a target and, if available, other target-related information, for fusing the sensed information to aid in determining at least the friendly or hostile nature of the target (214). The situational awareness arrangement also includes a location determination algorithm (220) coupled for receiving fused sensed target information. The location determination algorithm (A) selects (411) polygons (300) associated with the regions of interest, with each of the polygons (300) defining a plurality of vertex nodes separated by line segments. The location determination algorithm also includes (B) preprocessing (400) of at least one of the polygons (300) by (a) establishing a set of additional nodes (415) by projecting in a selected ordinate direction (x direction, for example) from each vertex to the intersection at a node with another line segment, to thereby define bins extending in the selected ordinate direction (the x direction). Each of these bins includes line segments of the polygon and projection lines extending between vertices and nodes. The preprocessing (400) also (b) orders (424) the line segments (424) according to their other ordinate value (y, for example), to thereby generate at least one set of ordered bins. The preprocessing (400) also (c) sorts the bins in an ascending or descending order (474) to build a bin database (426), and (d) builds an accelerated search tree (476), which may be a logarithmic search tree. The location determination algorithm also (C) processes (500) target track position measurements in conjunction with the set of ordered bins by selecting (512) (a) that one of the bins from the ordered set of bins in which the target coordinate value in the ordinate direction (x, for example) lies, and, (b) if there are plural bins which encompass the target coordinate value in the ordinate direction, selecting that one of the bins in which the target coordinate value in the ordinate direction lies and in which the target coordinate values in the other ordinate direction lies. The selected one of the bins is deemed (518) to be the bin in which the target coordinate values lie, thereby establishing in which region the selected one of the bins lies.

What is claimed is:

1. A system for computer-based classification of target information, where said target information is expressed in terms of geographic regions of interest, said system comprising:
at least one sensor for sensing information relating to a target location;
a computer processor; and
a memory device operatively connected to the processor and storing instructions that, when executed by the processor, cause the system to:
fuse said information sensed by the at least one sensor to generate fused target information;
select polygons associated with said regions of interest from the fused target information, each of said polygons defining a plurality of vertex nodes separated by line segments;
project in a selected ordinate direction from each vertex node to the intersection at a node with another line segment to thereby define bins extending in said selected ordinate direction, each of which bins includes line segments of the polygon and projection lines extending between nodes;
order said line segments according to their other ordinate values to thereby generate at least one set of ordered bins;
sort the bins to thereby build a bin database;
build an accelerated search tree from said bin database;
process target position measurements in conjunction with said accelerated search tree by selecting (a) that one of said bins from said ordered set of bins in which the target coordinate value in said ordinate direction lies, and, (b) if there are plural bins which encompass said target coordinate value in said ordinate direction, selecting that one of said bins in which the target coordinate value in said ordinate direction lies and in which the target coordinate values in the other ordinate direction lies; and
deem said selected one of said bins to be the bin in which said target coordinate values lie, thereby establishing in which region of interest said selected one of said bins lies.

2. A system according to claim 1, wherein said accelerated search tree is a logarithmic search tree.

3. A system according to claim 1, wherein the memory device further stores instructions that, when executed by the processor, deem said target to be one hostile or friendly based on the region in which said selected one of said bins lies.

4. A system according to claim 3, further comprising countermeasures responsive to the deeming of said target to be hostile for engaging said target.

5. A system according to claim 1, wherein said sorting of the bins to thereby build a bin database is performed in one of ascending and descending order.

6. A method for determining the location of a target within regions of interest, said method comprising the steps of:
using a sensor, sensing information relating to a target location, to thereby generate sensed target location information relating to at least one of the present and previous locations of a target;
fusing, in a computer process, said sensed target information relating to at least one of the present and previous locations of a target with other target-related information, if available, to thereby generate fused target coordinate information;
in a computer process, selecting polygons associated with said regions of interest, each of said polygons defining a plurality of vertex nodes separated by line segments;
in a computer process, processing at least one of said selected polygons by establishing a set of additional nodes by projecting in a selected ordinate direction from each vertex node to the intersection at an additional node with another line segment, to thereby define bins extending in said selected ordinate direction, each of which bins includes line segments of the polygon and projection lines extending between vertex nodes and additional nodes;
in a computer process, ordering said line segments of said bins according to their other ordinate value, to thereby generate at least one set of ordered bins;
in a computer process, sorting said ordered bins to build a bin database;
in a computer process, building an accelerated search tree from said bin database;
in a computer process, selecting that one of said bins from said accelerated search tree in which the target coordinate value in said ordinate direction lies, and
if there are plural bins which encompass said target coordinate value in said ordinate direction, selecting that one of said bins in which the target coordinate value in said ordinate direction lies and in which the target coordinate values in the other ordinate direction lies;
in a computer process, deeming the selected one of said bins to be the bin in which said target coordinate values lie, thereby establishing in which region said target lies.

7. A method according to claim 6, wherein said step of sorting said ordered bins includes the step of ordering said bins in one of ascending and descending order.

8. A method according to claim 6, further comprising the steps of, in a computer process:
sensing information relating to said target location using a second sensor, to thereby generate second target location information; and fusing said sensed target location information with said second target location information to thereby generate said target coordinate information.

9. A method according to claim 6, further comprising, in a computer process following said step of deeming the selected one of said bins to be the bin in which said target coordinate values lie, deeming said target to be one of at least hostile and friendly based on one of the present and previous regions in which said target lies.

10. A method according to claim 9, further comprising the computer process step, after said step of deeming said target to be hostile, of initiating countermeasures.

11. A method for determining the location of a target within regions of interest, said method comprising the steps of:
sensing information relating to a target location,
selecting polygons associated with said regions of interest, each of said polygons defining a plurality of vertex nodes separated by line segments;
processing at least one of said selected polygons by establishing a set of additional nodes by projecting in a selected ordinate direction from each vertex node to the intersection at an additional node with another line segment, to thereby define bins extending in said selected ordinate direction, each of which bins includes line segments of the polygon and projection lines extending between vertex nodes and additional nodes;
selecting that one of said bins in which the target coordinate value in said ordinate direction lies, and, if there are plural bins which encompass said target coordinate value in said ordinate direction, selecting that one of said bins in which the target coordinate value in said ordinate direction lies and in which the target coordinate values in the other ordinate direction lies; and
deeming the selected one of said bins to be the bin in which said target coordinate values lie, thereby establishing in which region said target lies.

12. A method according to claim 11, further comprising the step of ordering said line segments of said bins according to their other ordinate value, to thereby generate at least one set of ordered bins.

13. A method according to claim 12, further comprising the step of sorting said ordered bins to build a bin database.

14. A method according to claim 13, wherein the step of sorting said ordered bins includes the step of ordering said bins in one of ascending and descending order.

15. A method according to claim 11, wherein the step of sensing information relating to a target location includes sensing information using a first sensor, and the method further comprises the steps of:
sensing information relating to said target location using a second sensor, to thereby generate second target location information; and
fusing said sensed target location information with said second target location information to thereby generate said target coordinate information.

* * * * *